US012801597B2

(12) United States Patent
Modelo-Howard et al.

(10) Patent No.: US 12,801,597 B2
(45) Date of Patent: Nov. 17, 2026

(54) NATURAL LANGUAGE QUERY TO DOMAIN-SPECIFIC DATABASE QUERY CONVERSION WITH LANGUAGE MODELS

(71) Applicant: Palo Alto Networks, Inc., Santa Clara, CA (US)

(72) Inventors: Gaspar Modelo-Howard, Fremont, CA (US); Sathya Prakash Rajagopal, San Jose, CA (US); Chandra Biksheswaran Mouleeswaran, Cupertino, CA (US); Alok Tongaonkar, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 15 days.

(21) Appl. No.: 18/598,830

(22) Filed: Mar. 7, 2024

(65) Prior Publication Data

US 2025/0284683 A1 Sep. 11, 2025

(51) Int. Cl.
*G06F 16/2452* (2019.01)
*G06F 16/242* (2019.01)
*G06F 16/901* (2019.01)

(52) U.S. Cl.
CPC ........ *G06F 16/2452* (2019.01); *G06F 16/243* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 11,347,803 | B2 * | 5/2022 | Prabhugaonkar | G06F 16/90332 |
| 12,010,076 | B1 * | 6/2024 | Andrew | H04L 51/046 |
| 2015/0356130 | A1 * | 12/2015 | Clifford | G06F 16/282 707/741 |
| 2018/0052824 | A1 * | 2/2018 | Ferrydiansyah | G06N 20/00 |
| 2018/0173808 | A1 * | 6/2018 | Sharma | G06F 16/953 |
| 2019/0362009 | A1 * | 11/2019 | Miseldine | G06F 16/9032 |
| 2020/0066391 | A1 * | 2/2020 | Sachdeva | G16H 20/40 |
| 2020/0073984 | A1 * | 3/2020 | Sen | G06F 16/243 |
| 2020/0133441 | A1 * | 4/2020 | Smith | G06F 16/2246 |

(Continued)

*Primary Examiner* — Khanh B Pham
*Assistant Examiner* — Navneet Gmahl
(74) *Attorney, Agent, or Firm* — Gilliam IP PLLC

(57) ABSTRACT

A natural language to database query converter (converter) receives a natural language query from a user (i.e., a user utterance) and identifies a cybersecurity domain related to intent of the natural language query. The converter then generates a database query for a query language of the cybersecurity domain corresponding to the natural language query with a large language model (LLM). An initial prompt to the LLM generated by the converter specifies a grammar of the query language and instructs the LLM to generate an initial database query that functions like the natural language query and satisfies the grammar. If a lint program determines that the initial database query is not valid for the query language, the converter generates a follow-up prompt to the LLM that indicates valid database queries from which to generate a follow-up database query. A query parser retrieves data that satisfy the initial or follow-up database query and a visualization/summarization module generates graph visualizations and summaries of the retrieved data.

20 Claims, 7 Drawing Sheets

(56) References Cited

U.S. PATENT DOCUMENTS

| | | | | |
|---|---|---|---|---|
| 2020/0134032 | A1* | 4/2020 | Lin | G06F 16/2456 |
| 2020/0210524 | A1* | 7/2020 | Yang | G06F 16/283 |
| 2020/0394190 | A1* | 12/2020 | Chaudhuri | G06F 16/243 |
| 2020/0401590 | A1* | 12/2020 | Staar | G06F 40/30 |
| 2021/0019309 | A1* | 1/2021 | Yadav | G06F 16/248 |
| 2021/0064828 | A1* | 3/2021 | Johnson Premkumar | G10L 15/063 |
| 2021/0216928 | A1* | 7/2021 | O'Toole | G06F 16/29 |
| 2022/0067037 | A1* | 3/2022 | Ranganathan | G10L 15/22 |
| 2022/0121656 | A1* | 4/2022 | Zheng | G06F 18/24133 |
| 2022/0337620 | A1* | 10/2022 | Hadden | H04L 63/20 |
| 2022/0382752 | A1* | 12/2022 | Yadav | G06F 16/245 |
| 2022/0405314 | A1* | 12/2022 | Du | G06F 40/56 |
| 2022/0414228 | A1* | 12/2022 | Difonzo | G06F 16/24522 |
| 2023/0004562 | A1* | 1/2023 | Chaudhuri | G06F 16/243 |
| 2023/0098783 | A1* | 3/2023 | Zaremoodi | G06N 3/044 704/243 |
| 2024/0037327 | A1* | 2/2024 | Kallepalli | G06F 40/211 |
| 2024/0061835 | A1* | 2/2024 | Subramanian | G06F 16/252 |
| 2024/0127026 | A1* | 4/2024 | Manandise | G06N 3/006 |
| 2024/0143584 | A1* | 5/2024 | Birru | G06F 16/243 |
| 2024/0184829 | A1* | 6/2024 | Roy | G06F 16/243 |
| 2024/0303235 | A1* | 9/2024 | Kulkarni | G06F 16/24522 |
| 2025/0080551 | A1* | 3/2025 | Barnes | H04L 63/1416 |
| 2025/0200034 | A1* | 6/2025 | Raviv | G06Q 30/0242 |

* cited by examiner

NATURAL LANGUAGE QUERY TO DOMAIN-SPECIFIC DATABASE QUERY CONVERSION WITH LANGUAGE MODELS

BACKGROUND

The disclosure generally relates to data processing (e.g., CPC subclass G06F) and to computing arrangements based on specific computational models (e.g., CPC subclass G06N).

Chatbots are commonly employed to provide automated assistance to users by simulating human conversation via chat-based interactions. Example use cases for chatbots include handling customer inquiries, automating tasks, providing information, and delivering recommendations. Chatbots are increasingly implemented using artificial intelligence (AI) to handle and respond to natural language inputs from users, with implementations rapidly adopting generative AI for text generation.

A multitude of generative AI technologies are built upon transformer models. The "Transformer" architecture was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large language models (LLMs) are based on the Transformer architecture.

With Transformer-based LLMs, the meaning of model training has expanded to encompass pre-training and fine-tuning. In pre-training, the LLM is trained on a large training dataset for the general task of generating an output sequence based on predicting a next sequence of tokens. In fine-tuning, various techniques are used to fine-tune the training of the pre-trained LLM to a particular task. For instance, a training dataset of examples that pair prompts and responses/predictions are input into a pre-trained LLM to fine-tune it. Prompt-tuning and prompt engineering of LLMs have also been introduced as lightweight alternatives to fine-tuning. Prompt engineering can be leveraged when a smaller dataset is available for tailoring an LLM to a particular task (e.g., via few-shot prompting) or when limited computing resources are available. In prompt engineering, additional context may be fed to the LLM in prompts that guide the LLM as to the desired outputs for the task without retraining the entire LLM.

BRIEF DESCRIPTION OF THE DRAWINGS

Embodiments of the disclosure may be better understood by referencing the accompanying drawings.

DESCRIPTION

Figure 1:
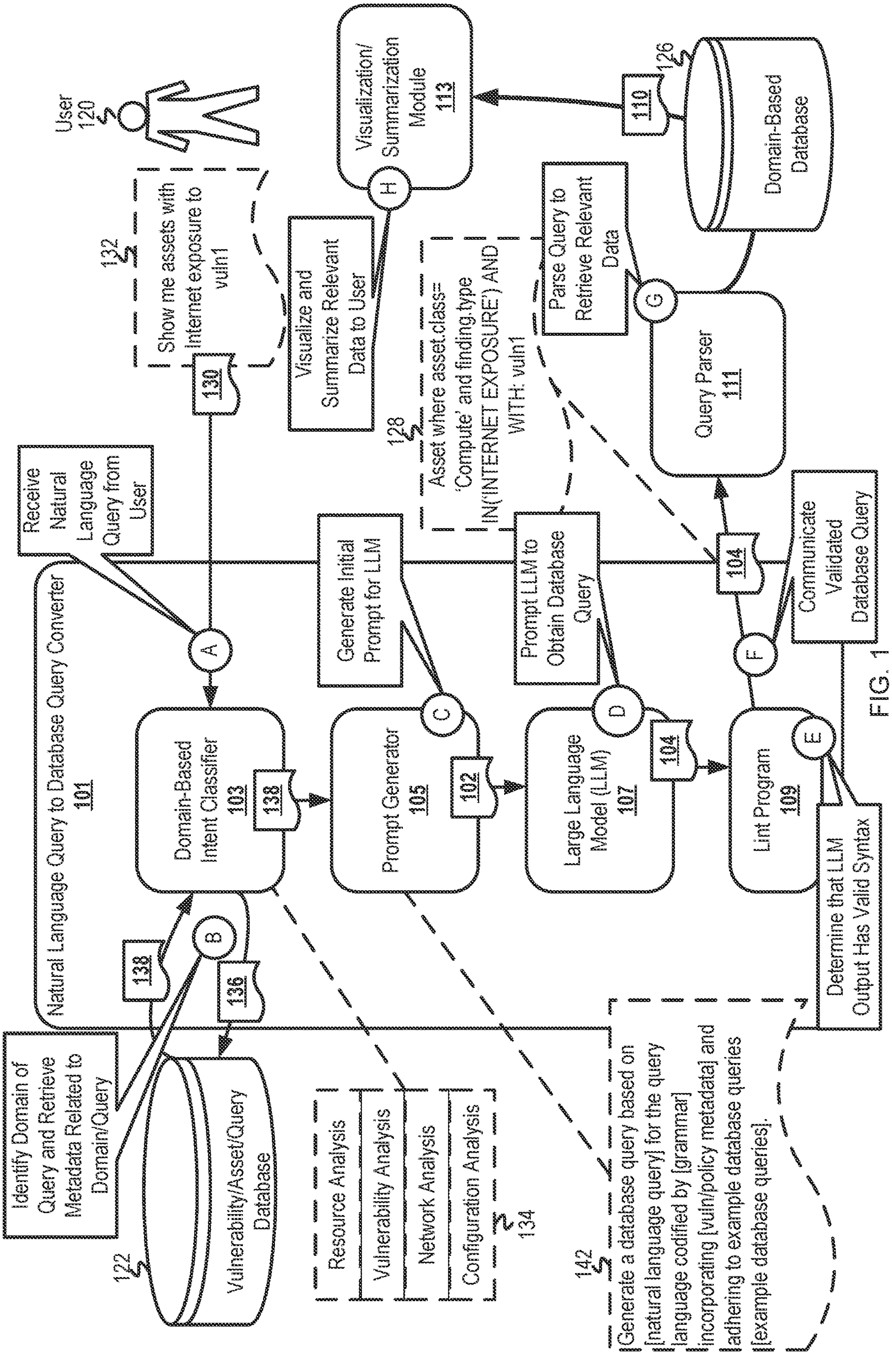
FIG. 1 is a schematic diagram of an example system for converting natural language queries from a user into database queries for predicted query languages using an initial prompt and retrieving and presenting data responsive to the database queries.

The description that follows includes example systems, methods, techniques, and program flows to aid in understanding the disclosure and not to limit claim scope. Well-known instruction instances, protocols, structures, and techniques have not been shown in detail for conciseness.

Overview

Domain-specific database search has an upfront time cost for users who are not familiar with syntax for varying database query languages across domains, particularly when query language domains are beyond a user's area of expertise and/or when a user is utilizing proprietary query languages. Moreover, even when users may be familiar with query languages, there is an inherent inefficiency for a user to determine query syntax for database queries based on plain (natural) language queries formulated by the user. The present disclosure proposes a framework for automated generation of database queries from natural language queries from users across cybersecurity domains.

Based on a natural language query from a user, an intent classifier predicts an intent and corresponding cybersecurity domain that corresponds to a database query language related to the natural language query. Based on the predicted intent/cybersecurity domain, the intent classifier retrieves metadata related to cybersecurity assets/vulnerabilities in the natural language query, relevant example database queries for the database query language, and a grammar description for the database query language. A prompt generator generates an initial prompt for a LLM that describes the grammar for the database query language, the vulnerability and policy metadata, and instructions to generate a database query according to the grammar as described by the natural language query and using the asset/vulnerability metadata. The prompt generator prompts the LLM with the initial prompt, and a lint program determines whether an initial database query output by the LLM in response is valid for the database query language (e.g., has valid syntax and does not have erroneous or suspicious constructs). If the lint program determines the initial database query is valid, the lint program communicates the initial database query to a query language parser to retrieve domain-based data indicated by the natural language query. A visualization/summarization module receives retrieved data from the query language parser and generates a graph structure describing relationships between assets, vulnerabilities, and any other cybersecurity-related entities indicated by the natural language query.

However, in some instances, (e.g., when the user's natural language query is not fully formed or is incomplete), the output of the LLM can hallucinate or otherwise be incorrect, resulting in invalid syntax of the initial database query when evaluated by the lint program. In these instances, the lint program queries a database of valid queries for the database query language for one or more valid database queries and corresponding natural language queries that are semantically similar to the natural language query from the user. The prompt generator uses the valid database queries and corresponding natural language queries to generate a follow-up prompt that instructs the LLM to update the initial database query to resemble one of the valid queries. If the lint program determines that a follow-up database query obtained as output from prompting the LLM with the follow-up prompt is valid, the lint program communicates the follow-up database query to the user with an indication that an exact query match was not available for the natural language query. The query parser can additionally retrieve data for the follow-up database query for the visualization/summarization module to present to the user.

EXAMPLE ILLUSTRATIONS

FIG. 1 is a schematic diagram of an example system for converting natural language queries from a user into database queries for predicted query languages using an initial prompt and retrieving and presenting data responsive to the database queries. The operations in FIGS. 1 and 2 overlap, with the exception that in FIG. 1 a database query output by an LLM in response to an initial prompt has valid syntax, whereas in FIG. 2, the database query in response to the initial prompt has invalid syntax, triggering additional steps for generating a follow-up database query with the LLM that has valid syntax.

Figure 2:
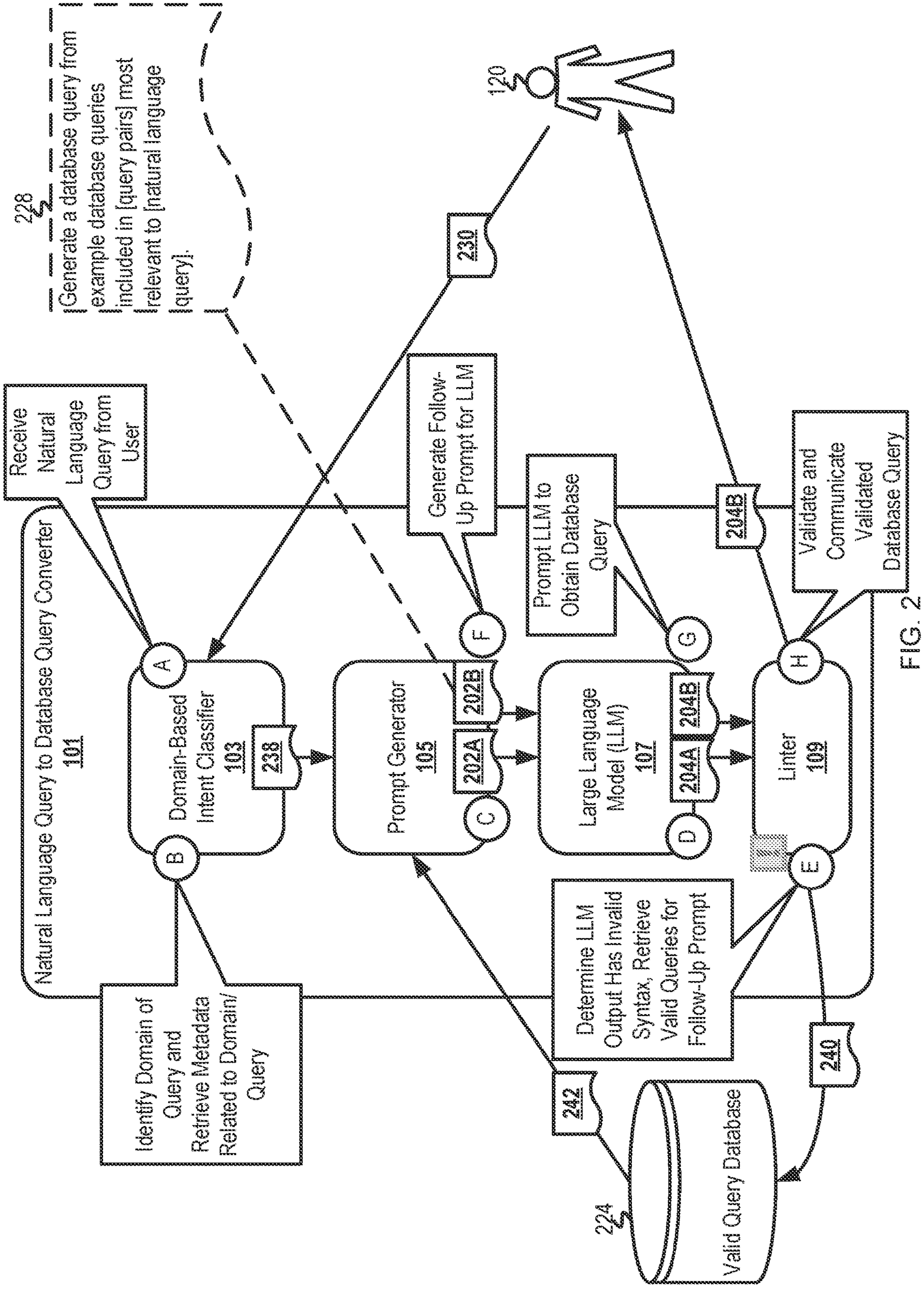
FIG. 2 is a schematic diagram of an example system for converting natural language queries from a user into database queries for predicted query languages using a follow-up prompt and retrieving and presenting data responsive to the database queries.

FIGS. 1 and 2 are both annotated with series of letters A-H. The operations at stages A-D of FIG. 1 are substantially similar to the operations at stages A-D of FIG. 2. As such, portions of the descriptions of these stages are omitted or succinctly summarized in reference to FIG. 2 to avoid redundancy. Although these stages are ordered for this example, the stages illustrate one example to aid in understanding this disclosure and should not be used to limit the claims. Subject matter falling within the scope of the claims can vary from what is illustrated.

Referring now to FIG. 1, a natural language query to database query converter (converter) 101 receives a natural language query 130 from a user 120 that specifies cybersecurity-related data to retrieve for the user 120. The converter 101 comprises a domain-based intent classifier (intent classifier) 103, a prompt generator 105, a LLM 107, and a lint program 109. The intent classifier 103 predicts an intent and corresponding cybersecurity domain to which the natural language query 130 is directed and retrieves relevant metadata 138 for assets/vulnerabilities related to the natural language query 130 and known queries for a query language corresponding to the predicted domain. The prompt generator 105 and the LLM 107 use the relevant metadata 138 to generate an initial database query 104. The lint program 109 determines that the initial database query 104 has valid syntax and communicates the initial database query 104 to a query parser 111. The query parser 111 retrieves relevant data 110 to the initial database query 104 that is communicated to a visualization/summarization module 113 for presentation to the user 120.

At stage A, the converter 101 receives the natural language query 130 from the user 120. The natural language query 130 is a query for cybersecurity data related to cybersecurity for the user 120, for instance, cybersecurity data related to assets associated with the user 120 in an organization, vulnerabilities experienced by the organization, etc. Example user query 132 comprises the text "Show me assets with Internet exposure to vuln1". The example user query 132 queries for assets associated with an organization of the user 120 that are exposed to the Internet through a vulnerability vuln1. In this example, vuln1 is a description of a vulnerability, e.g., "all vulnerabilities with exposure via log **4*j*". Alternatively, the natural language query 130** can specify Common Vulnerabilities and Exposures (CVE®) identifiers.

At stage B, the intent classifier 103 predicts an intent that corresponds to a domain of the natural language query 130 and communicates a query 136 related to the predicted domain and the natural language query 130 to a vulnerability/asset/query database 122. The vulnerability/asset/query database 122 returns the relevant metadata 138 to the intent classifier 103. Each predicted intent maps to a domain for a query language corresponding to the natural language query 130. Example domains 134 include resource analysis, vulnerability analysis, network analysis, and configuration analysis, and corresponding intents comprise user queries directed at resources, vulnerabilities, networks, and configurations, respectively. Example user query 132 corresponds to the vulnerability analysis domain. In some embodiments, the intent classifier 103 can predict multiple domains corresponding to the natural language query 130 and can split the natural language query 130 into multiple queries each corresponding to a different domain. The intent classifier 103 can be a machine learning model (e.g., a regression model, neural network, etc.) trained on natural language queries labelled by intent/domain.

The query 136 indicates assets included in the natural language query 130. For instance, for example user query 132, the query 136 would specify vulnerability description "vuln1". In response, the relevant metadata 138 can indicate Common Vulnerabilities and Exposures (CVE®) identifiers related vulnerabilities with description "vuln1". Alternatively, when the natural language query 130 specifies CVE identifiers, the vulnerability/asset/query database 122 can determine whether the CVE identifiers are valid and remove invalid CVE identifiers. In other embodiments when the natural language query 130 indicates one or more assets related to the user 120, the query 136 can indicate asset identifiers. When the natural language query 130 involves particular types of policies, query 136 can indicate policy types for policies to retrieve such as Internet exposure, encrypted data, etc. The relevant metadata 138 can in turn indicate policy metadata, configuration metadata, network metadata, etc. for those assets depending on the predicted intent/domain. In addition, the relevant metadata 138 includes examples of valid queries for the query language corresponding to the predicted intent/domain. The examples of valid queries can correspond to each domain-specific query language and can further comprise queries that are semantically similar to the natural language query 130. Semantic similarity refers to similarity of natural language embeddings (e.g., word2vec) generated using natural language processing (NLP).

The relevant metadata 138 depends on the domain/intent predicted by the intent classifier 103. Relevant metadata for resource analysis includes security policies deployed at resources, relevant metadata for vulnerability analysis includes CVE identifiers corresponding to vulnerability identifiers, relevant metadata for network analysis includes network policies/protocols across firewalls, gateways, etc., and relevant metadata for configuration analysis includes stored configuration files (e.g., configuration files for applications, processes, security policies, etc.).

At stage C, the prompt generator 105 generates an initial prompt 102 for the LLM 107 based on the relevant metadata 138. The initial prompt 102 is generated based on an initial template engineered for prompts of the LLM 107. The initial template includes fields/sections to insert any vulnerabilities, asset metadata, example queries, and other metadata included in the relevant metadata 138, a description of grammar for the domain-specific query language (e.g., as specified in a grammar file or natural language description of a grammar file), and instructions for the LLM 107. The instructions specify converting the natural language query 130 into a database query for the domain-specific query language with syntax according to the grammar file and in accordance with the provided example queries. The instructions further specify using/inserting the vulnerabilities/policies/other metadata into relevant database query fields. Example initial prompt 142 includes the text "Generate a database query based on [natural language query] for the query language codified by [grammar] incorporating [vuln/policy metadata] and adhering to example database queries [example database queries]." The initial prompt 102 can be converted into embeddings using NLP, for instance when the LLM 107 is configured to receive language embeddings rather than text.

At stage D, the prompt generator 105 prompts the LLM 107 with the initial prompt 102 to obtain the initial database query 104 as output. At stage E, the lint program 109 determines that the initial database query 104 has valid syntax according to the domain-specific database query language. The lint program 109 can comprise any tool that is able to identify syntax errors, stylistic errors, potential vulnerabilities, suspicious constructs, etc. in database queries according to the domain-specific database query language. The lint program 109 can be configured with the grammar of the domain-specific database query language to enable such analysis.

At stage F, the lint program 109 communicates the (now validated) initial database query 104 to the query parser 111. Example initial database query 104 comprises the text "Asset where asset.class='Compute' and finding.type IN('INTERNET EXPOSURE') AND WITH: vuln1". Note that in some embodiments, the example initial database query 104 could indicate CVE identifiers corresponding to vulnerability description vuln1.

At stage G, the query parser 111 parses the initial database query 104 according to its query language to retrieve relevant data 110 from a domain-based database 126 that the query parser 111 communicates to the visualization/summarization module 113. As an example, the query parser 111 can have a grammar expressed as Backus-Naur form derivation rules.

At stage H, the visualization/summarization module 113 receives the relevant data 110 and generates a visualization and summarization of the relevant data 110 to the user 120. The visualization includes a graph structure of affected assets and relationships between those assets, vulnerabilities, and exposure to the Internet. An example summarization/visualization and example operations performed by the visualization/summarization module 113 are depicted in greater detail in reference to FIG. 3.

The prompt generator 105 and the LLM 107 in FIG. 1 are specific to the domain predicted by the intent classifier 103 for the natural language query 130. Different domains can have different prompt templates for prompt generation stored by the prompt generator 105 and different LLMs, and the converter 101 can retrieve templates/LLMs based on the predicted domain. The lint program 109 is depicted as validating a single database query for a single database query language. However, the lint program 109 can be configured to validate database queries for multiple supported query languages, and the initial database query 104 can specify the domain-specific query language to the lint program 109.

FIG. 2 is a schematic diagram of an example system for converting natural language queries from a user into database queries for predicted query languages using a follow-up prompt and retrieving and presenting data responsive to the database queries. At stage A, the converter 101 receives a natural language query 230 from the user 120. At stage B, the intent classifier 103 predicts an intent and corresponding domain for the natural language query 230 and retrieves relevant metadata 238 related to the predicted intent/domain and the natural language query 230. At stage C, the prompt generator 105 generates an initial prompt 202A based on the relevant metadata 238 and at stage D the prompt generator 105 prompts the LLM 107 with the initial prompt 202A to obtain an initial database query 204A as output.

In contrast to stage E in FIG. 1, at stage E in FIG. 2 the lint program 109 determines that the initial prompt 202A is invalid for the query language corresponding to the predicted domain. Based on this determination, the lint program 109 communicates a query 240 to a valid query database 224 that indicates the natural language query 230, and the valid query database 224 returns valid database query/natural language query pairs (query pairs) 242. Natural language queries in the query pairs 242 comprise natural language queries that are semantically similar to the natural language query 230 (e.g., according to NLP embeddings). The valid query database 224 can have an architecture configured for semantic similarity search based on natural language queries. The query pairs 242 can comprise database queries previously determined to be valid by a cybersecurity vendor deploying the converter 101, by domain-level experts from the organization of the user 120, etc.

At stage F, the prompt generator 105 generates a follow-up prompt 202B for the LLM 107. In contrast to the initial prompt 202A, rather than instructing the LLM 107 to generate a database query based on grammar of the query language and metadata related to a natural language query, the follow-up prompt 202B instructs the LLM 107 to generate a database query that specifically resembles one of the valid database queries in the query pairs 242. Example follow-up prompt 228 comprises the text "Generate a database query from example database queries included in [query pairs] most relevant to [natural language query]." Format of the instructions included in the follow-up prompt 202B ensures a high likelihood that the follow-up database query 204B is valid according to the domain-specific query language. At stage G, the prompt generator 105 prompts the LLM 107 with the follow-up prompt 202B to obtain a follow-up database query 204B as output.

At stage H, the lint program 109 determines that the follow-up database query 204B is valid and communicates the now-validated follow-up database query 204B to the user 120. The user 120 can then choose whether the follow-up database query 204B sufficiently captures the natural language query 230. The user 120 can additionally be presented with a search and investigate portal to manually search for results to the natural language query 230 when the follow-up database query 204B is insufficient.

In embodiments where, at stage H in FIG. 2, the lint program 109 determines that the follow-up database query 204B is invalid, the converter 101 can redirect the user 120 to a separate interface of resolution of the natural language query 230. For instance, the lint program 109 can redirect the user 120 to documentation of the domain-based query language or to an interface for navigating resources, vulnerabilities, etc. of the organization.

FIGS. 1 and 2 depict retrieval of cybersecurity-related metadata to include in prompts for generating database queries from natural language queries. These operations can apply when the corresponding domain-based query languages are for cybersecurity domains. For other types of domains, retrieved metadata can be metadata relevant to those domains or, in some embodiments, no relevant metadata is retrieved for these domains. Each module of the converter 101 is adapted to each domain/query language, and different prompt templates, LLMs, lint programs, etc. can be implemented for each domain/query language. Moreover, the converter 101 is modular so that each component can be easily updated as supported query languages are added or removed. In some embodiments, the LLM 107 can be a distinct component from the converter 101 and can be accessed by the converter 101 via calls to an application programming interface.

Figure 3:
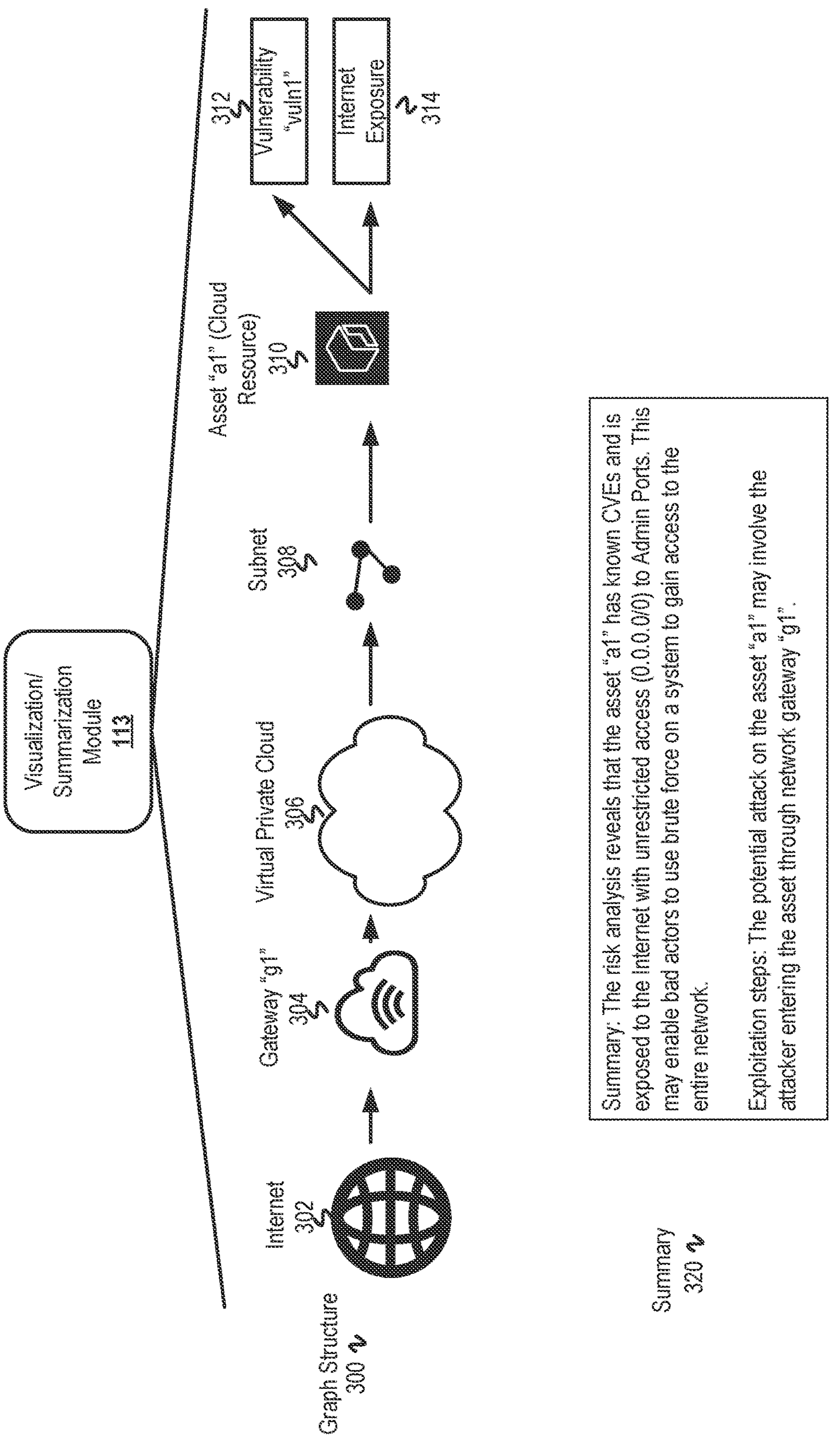
FIG. 3 is a conceptual diagram of an example visualization and summary of results from a natural language query converted to a database query.

FIG. 3 is a conceptual diagram of an example visualization and summary of results from a natural language query converted to a database query. Example graph structure 300 and example summary 320 generated by the visualization/summarization module 113 correspond to the example user query 132. The example graph structure 300 indicates information flow for exposure of asset "a1" 310 (a cloud resource) to the Internet 302 via gateway "g1" 304, virtual private cloud 306, and subnet 308, with directed arrows indicating the direction of information flow. Directional arrows leading out of asset "a1" 310 indicate that asset "al" 310 is exposed to the Internet (314) and is vulnerable via this exposure to "vuln1" (312). Example summary 320 of the Internet exposure of asset "al" 310 comprises the text:

Summary: The risk analysis reveals that the asset "al" has known CVEs and is exposed to the Internet with unrestricted access (0.0.0.0/0) to Admin Ports. This may enable bad actors to use brute force on a system to gain access to the entire network. Exploitation steps: The potential attack on the asset "al" may involve the attacker entering the asset through network gateway "g1".

Although depicted for a single asset and vulnerability, natural language queries indicating or corresponding to multiple vulnerabilities and yielding results comprising multiple assets can correspond to a graph structure with multiple information flows leading to multiple vulnerabilities. The examples depicted in FIG. 3 are for a domain-based query language related to cybersecurity. A query parser for this query language (e.g., the query parser 111) can be configured to access a database or other data structure storing relationships between assets and vulnerabilities/exposures across an organization. When parsing database queries for the query language, the query parser can access these data structures to identify the graph structures related to the database query and return these graph structures to the visualization/summarization module 113. Summarization can be performed by a language model component of the visualization/summarization module 113, for instance an LLM prompted to summarize the graph structure with a prompt comprising metadata of the graph structure and instructions to summarize exposure/vulnerabilities of associated assets.

Figure 4:
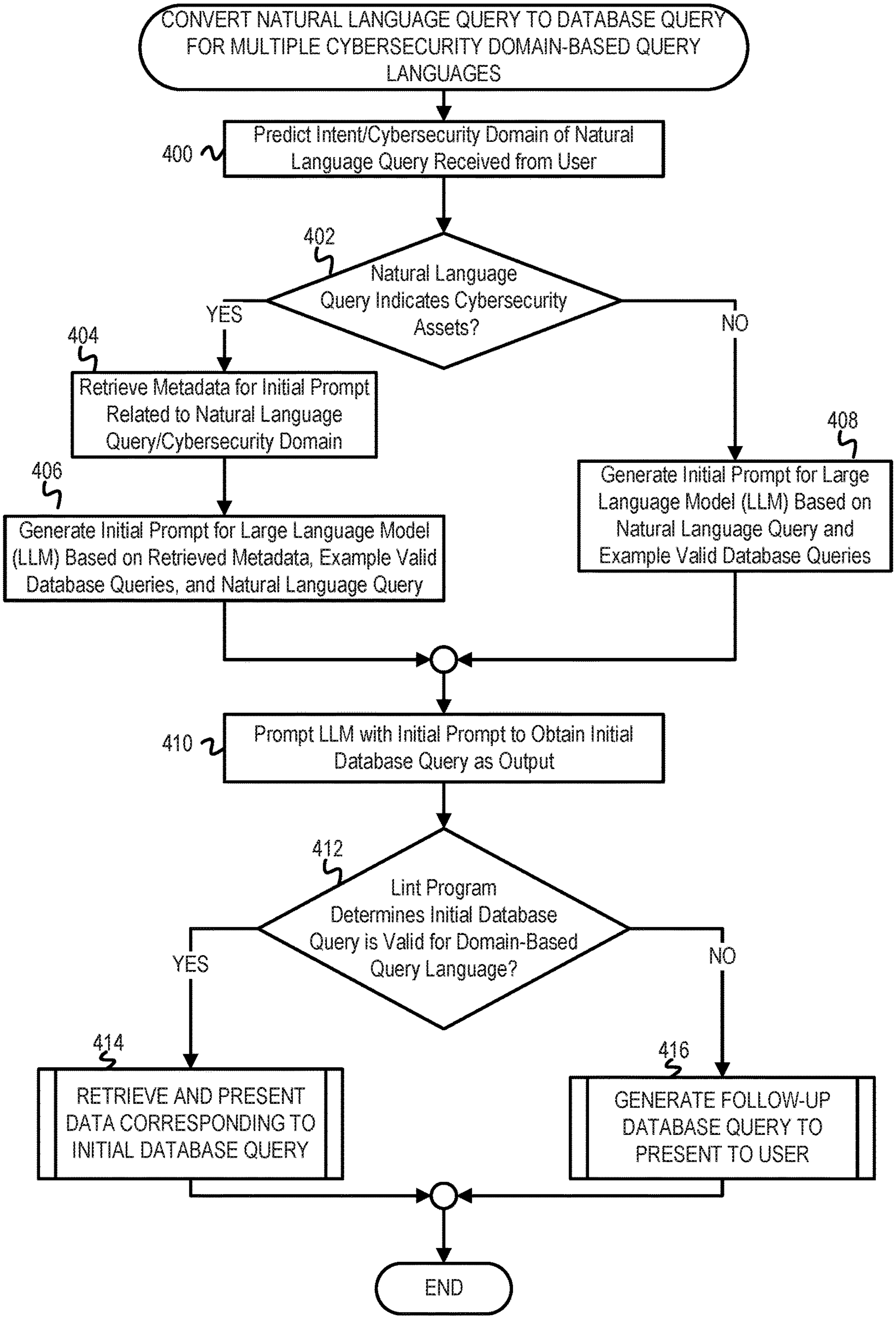
FIG. 4 is a flowchart of example operations for converting a natural language query to a database query for multiple cybersecurity domain-based query languages.
Figure 5:
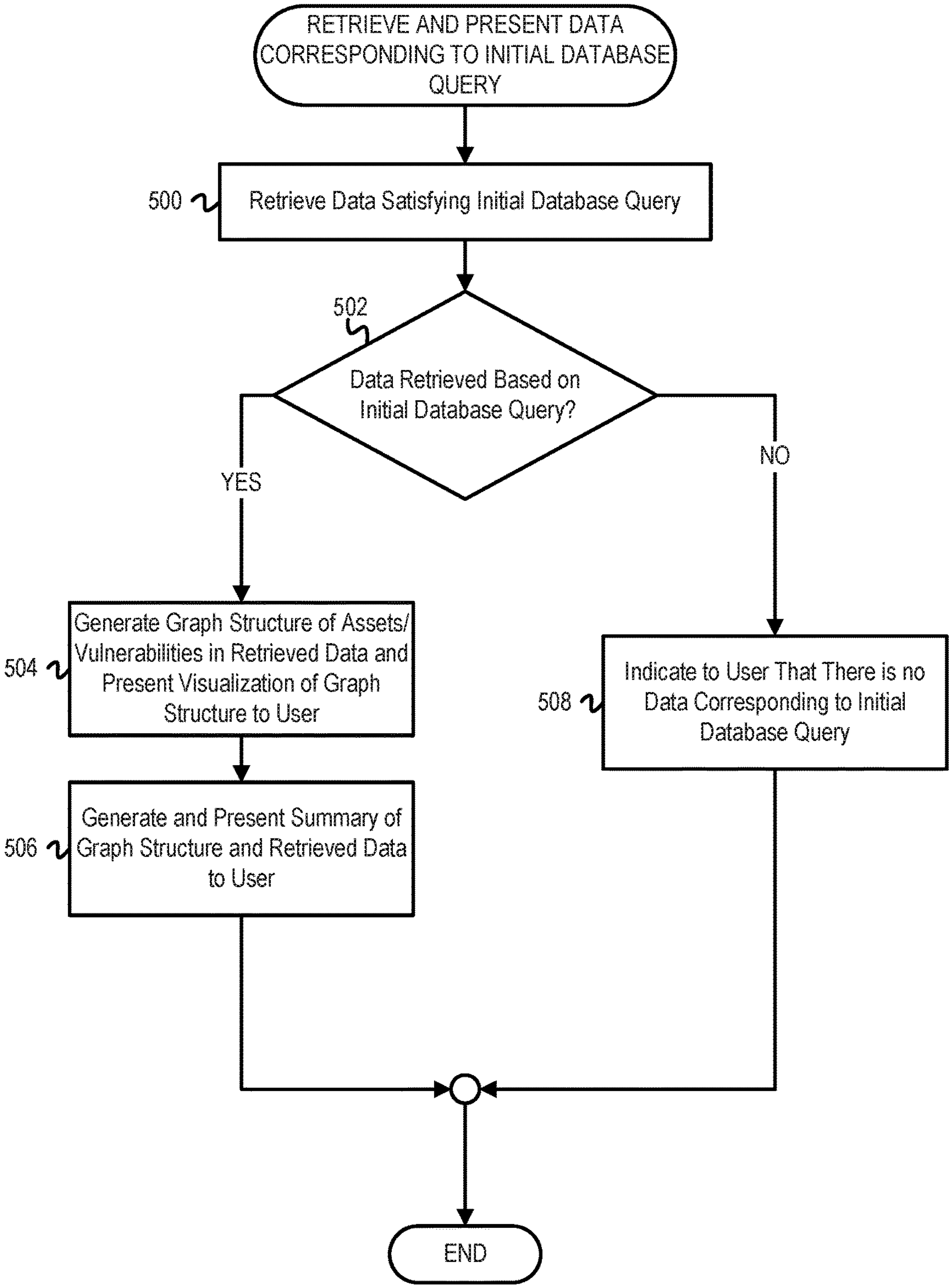
FIG. 5 is a flowchart of example operations for retrieving and presenting data corresponding to an initial database query.
Figure 6:
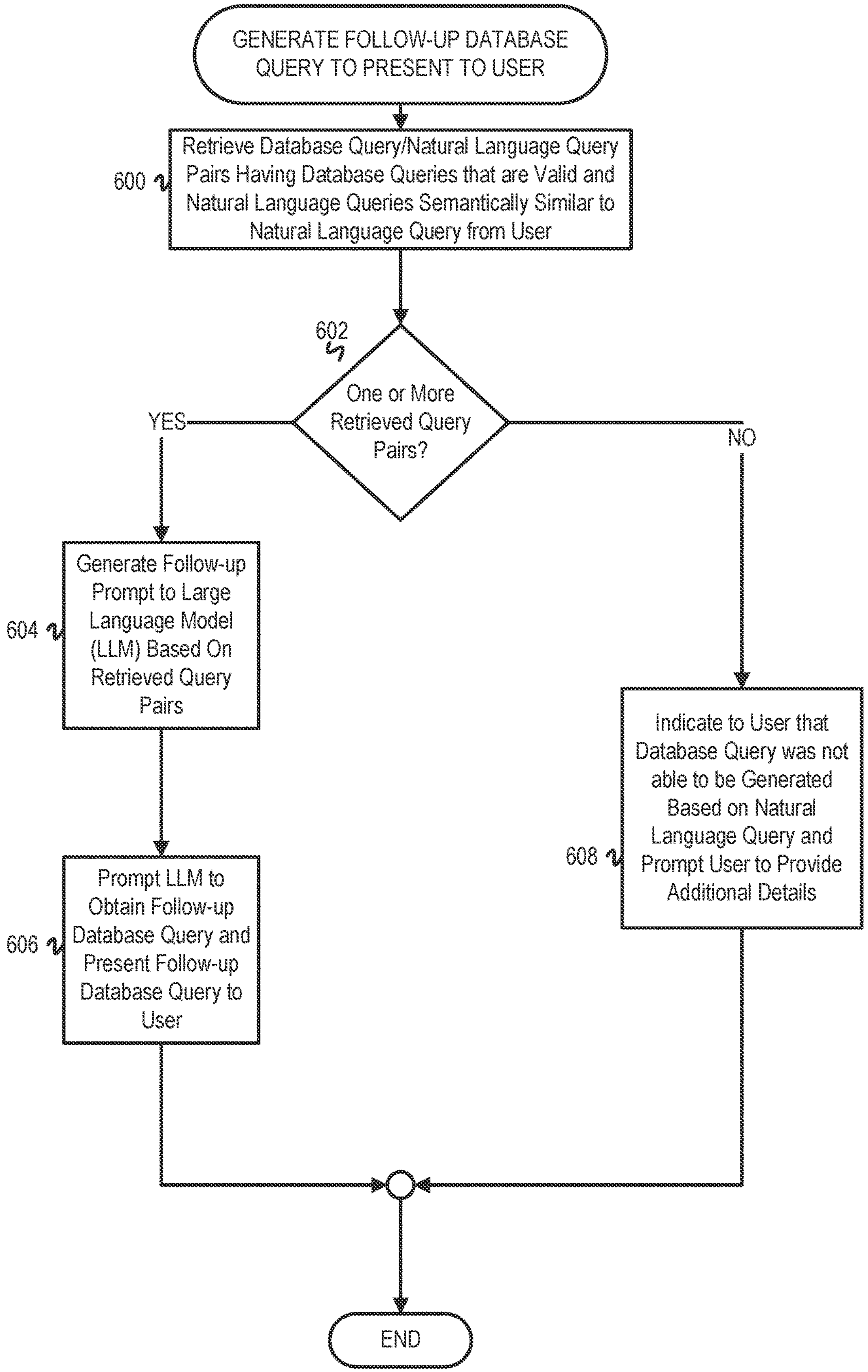
FIG. 6 is a flowchart of example operations for generating a follow-up database query to present to a user.

FIGS. 4-6 are flowcharts of example operations for converting natural language queries into database queries for multiple cybersecurity domain-based query languages using initial and follow up prompts to LLMs. The example operations are described with reference to a natural language to database query converter (converter), a query parser, and a visualization/summarization module for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for converting a natural language query to a database query for multiple cybersecurity domain-based query languages. The natural language query is assumed to have been communicated by a user and to correspond to one or more cybersecurity domains among multiple cybersecurity domains (e.g., resource analysis, vulnerability analysis, network analysis, configuration analysis, etc.).

At block 400, the converter predicts an intent and corresponding cybersecurity domain from a natural language query received from a user. For instance, the converter can comprise an intent classifier (e.g., regression model, support vector machine, etc.) trained on natural language queries labelled by known intent/domain. The intent classifier can preprocess the natural language query with NLP prior to classification.

At block 402, the converter determines whether the natural language query indicates cybersecurity assets. Examples of cybersecurity assets include resources, firewalls, network controllers, etc. The converter can make this determination by extracting entities from the natural language query (e.g., with named entity recognition) and determining whether the extracted entities match a list of asset types for which metadata can be retrieved. If the natural language query indicates cybersecurity assets, operational flow proceeds to block 404. Otherwise, operational flow proceeds to block 408.

At block 404, the converter retrieves metadata for an initial prompt related to the natural language query and the cybersecurity domain. The metadata comprises metadata related to cybersecurity assets identified in the natural language query. For instance, when the natural language query indicates vulnerability descriptions, the retrieved metadata can comprise CVE identifiers related to the vulnerability identifier. The retrieved metadata depends on the cybersecurity domain in addition to the cybersecurity assets. For different cybersecurity domains, different types of metadata related to the cybersecurity assets are retrieved.

At block 406, the converter generates an initial prompt for an LLM based on the retrieved metadata, example valid database queries, and the natural language query. The initial prompt comprises the retrieved metadata, the example valid database queries, the natural language query, a grammar for the domain-based query language. Instructions to the LLM in the initial prompt instruct the LLM to generate a database query that: 1) satisfies the grammar (e.g., as represented by a grammar file or natural language grammar description), 2) resembles the natural language query, 3) includes relevant data from the retrieved metadata, and 4) adheres to syntax of the example database queries. The initial prompt is generated according to an engineered prompt template that can depend on each domain, for instance by having fields and corresponding instructions for metadata related to corresponding domains.

At block 408, the converter generates the initial prompt for the LLM based on the example valid database queries and natural language query. The initial prompt can be generated similarly as described at block 406 by omitting sections for retrieved metadata related to cybersecurity assets, for instance using an alternative template to that used when the natural language query indicates cybersecurity assets. The example valid database queries can be fixed queries for each domain-based query language or can be selected/retrieved as queries that are semantically similar to the natural language query from the user. In embodiments where the example database queries are fixed for each domain-based query language, the example database queries can be included directly in a template, whereas when the example database queries are selected based on the natural language query, the example database queries can be inserted into the template once selected.

At block 410, the converter prompts the LLM with the initial prompt to obtain an initial database query as output. At block 412, a lint program determines whether the initial database query is a valid query for the domain-based query language. The lint program can be configured with the grammar of the domain-based query language to make this determination. The lint program comprises a lint program specific to the domain-based query language and can be a piece of static code loaded based on the predicted domain. If the lint program determines that the initial database query is valid, operational flow proceeds to block 414. Otherwise, operational flow proceeds to block 416.

At block 414, the query parser and the visualization/summarization module retrieve and present data corresponding to the initial database query. The operations at block 414 are described in greater detail in reference to FIG. 5.

At block 416, the converter generates a follow-up database query to present to the user. The operations at block 416 are described in greater detail in reference to FIG. 6.

FIG. 5 is a flowchart of example operations for retrieving and presenting data corresponding to an initial database query. At block 500, the query parser retrieves data that satisfy the initial database query. The query parser is configured to retrieve data from domain databases for a domain-based query language for which the initial database query is valid. At block 502, if the query parser is able to retrieve any data based on the initial database query, operational flow proceeds to block 504. Otherwise, operational flow proceeds to block 508.

At block 504, the visualization/summarization module generates a graph structure of assets/vulnerabilities and presents the visualization to the user. The graph structure indicates relationships between resources, vulnerabilities, networks, types of exposure, etc. The graph structure can vary by domain. For instance, a graph structure for the resource analysis domain can indicate chains of resources and informational flow of data across those resources, which can elucidate possible attack chains for malicious attackers. The graph structure can be stored in data retrieved using the initial database query or can be inferred from the retrieved data, for instance by associating resources with vulnerabilities and tracking resource exposure to the Internet from the retrieved data.

At block 506, the visualization/summarization module generates and presents a summary of the graph structure and retrieved data to the user. For instance, the visualization/summarization module can generate a prompt for an LLM (possibly distinct from the LLM used to generate the database queries) to summarize asset exposure indicated by data in the graph structure and retrieved data. The summary can further describe possible steps for exploiting exposed assets.

At block 508, the converter indicates to the user that there is no data corresponding to the initial database query. The converter can additionally redirect the user to a search and investigate platform to further facilitate analysis of exposed assets and other cybersecurity risks.

FIG. 6 is a flowchart of example operations for generating a follow-up database query to present to a user. It is assumed that an LLM has already generated an initial database query for a domain-based query language corresponding to a natural language query from the user and that a lint program determined that the initial database query was not valid for the domain-based query language.

At block 600, the converter retrieves at least one pair of queries including a database query paired with a natural language query (query pairs). The database query in each query pair is valid for the domain-based query language and the natural language query in the query pair is semantically similar to the natural language query from the user. The query pairs can be generated by a cybersecurity vendor deploying the converter and can be further customized by an organization of the user to include typical query pairs related to the technology area of the organization. The converter retrieves the query pairs based on a threshold semantic similarity between the natural language query from the user and natural language queries from the pairs. If the converter retrieves one or more query pairs having natural language queries above the semantic similarity threshold, operational flow proceeds to block 604. Otherwise, operational flow proceeds to block 608.

At block 604, the converter generates a follow-up prompt to the LLM based on the retrieved query pairs. In contrast to the initial prompt to the LLM that instructs the LLM to generate a database query based on a grammar for the domain-based query language and other data, the follow-up prompt indicates the query pairs and asks the LLM to generate a database query based on the query pairs that most resembles a database query corresponding to the natural language query from the user.

At block 606, the converter obtains a follow-up database query from the LLM as output from prompting with the follow-up prompt and presents the follow-up database query to the user. The converter additionally presents a description indicating that the converter was not able to generate a database query as an exact match and this was the best approximate match possible. In some embodiments, the converter can proceed with retrieving data corresponding to the follow-up database query and present the user with a visualization/summarization of the retrieved data, e.g., according to the foregoing embodiments for the initial database query.

At block 608, the converter indicates to the user that a database query was not able to be generated based on the natural language query and prompts the user to provide additional details. Based on the user providing additional details, the converter can combine the natural language query with the additional details and repeat the operations depicted in FIGS. 4-6.

Variations

Prompting of LLMs with initial prompts and follow-up prompts as described in the foregoing can have various implementations. For instance, an LLM can be prompted with an initial prompt and then the LLM can be further prompted with the follow-up prompt to maintain conversational context of the initial prompt. Alternatively, internal parameters of the LLM can be reset to their original values prior to prompting with the follow-up prompt. Although described for an LLM, any language model that is able to respond to generated prompts can be implemented. Example LLMs that can be implemented include the ChatGPT® chatbot and the huggingchat chatbot.

The above description refers to natural language queries communicated by a user. These natural language queries can comprise any user utterances communicated for the purpose of conversion from the user utterances to a database query for a corresponding query language.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 4 can be performed in parallel or concurrently across natural language queries from users. With respect to FIG. 5, generating graph structures describing asset exposure is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
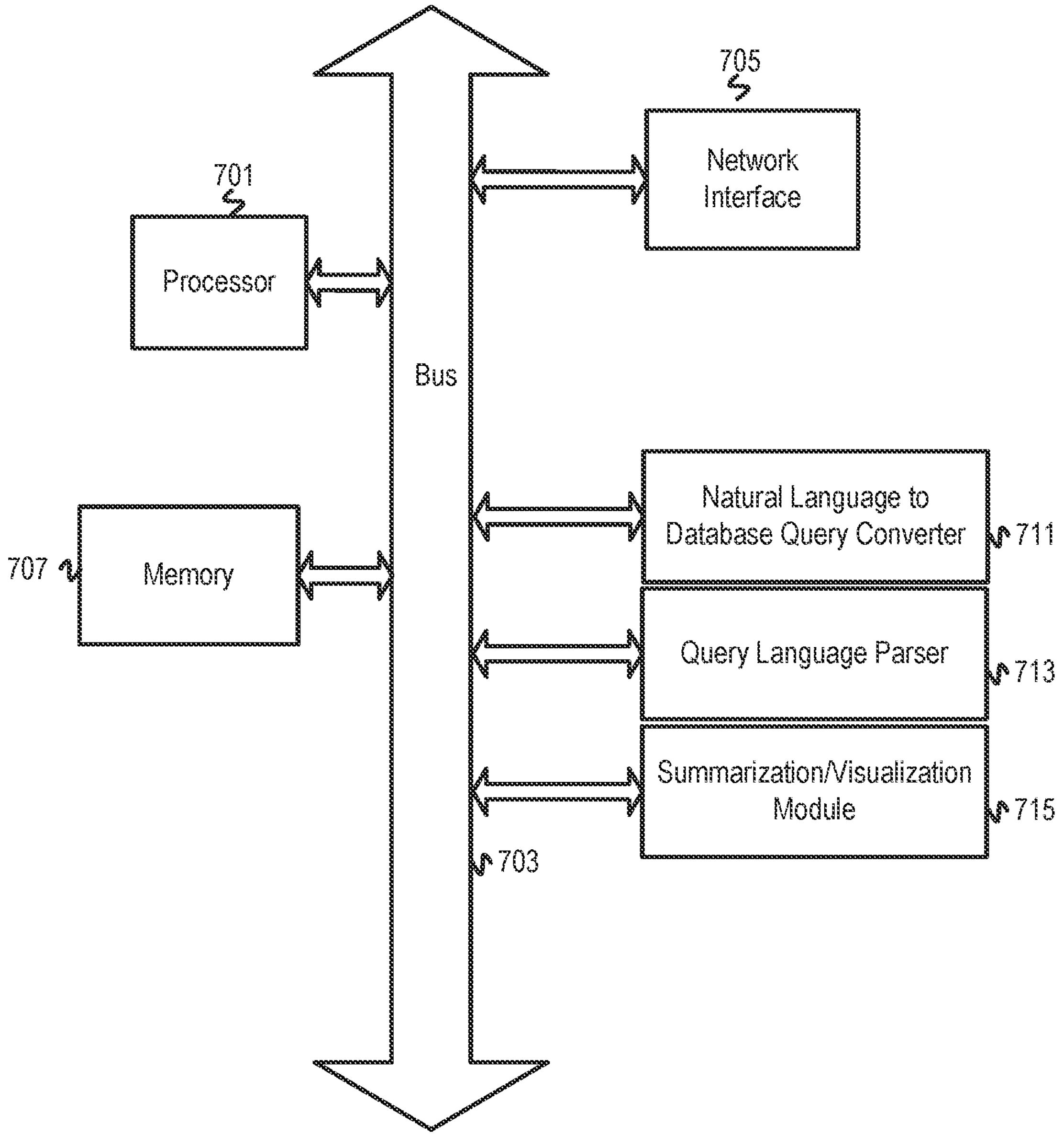
FIG. 7 depicts an example computer system with a natural language to database query converter, a query language parser, and a summarization/visualization module.

FIG. 7 depicts an example computer system with a natural language to database query converter, a query language parser, and a summarization/visualization module. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a natural language to database query converter (converter) 711, a query language parser, and a summarization/visualization module. The converter 711 receives a natural language query from a user and predicts user intent and a corresponding domain for a query language related to the user intent. The converter 711 then retrieves cybersecurity metadata related to the natural language query and prompts an LLM with an initial prompt. The initial prompt indicates the retrieved metadata, a grammar for the query language, the natural language query, and examples of valid database queries for the query language. If a lint program determines that an initial database query obtained as output from prompting the LLM with the initial prompt has valid syntax, the lint program forwards the initial database query to the query language parser 713. Otherwise, the converter 711 generates a follow-up prompt that, by contrast with the initial prompt, enumerates example valid database query/natural language query pairs (query pairs) and instructs the LLM to choose one of the query pairs that resembles the natural language query from the user to send to the query language parser 713 as a follow-up database query. The query language parser 713 receives either the initial database query or the follow-up database query and retrieves corresponding cybersecurity data related to the natural language query of the user. The summarization/visualization module 715 generates a graph structure and summary of the retrieved data to present to the user. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

TERMINOLOGY

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

determining, from a first natural language query, a database query language from a plurality of database query languages, wherein determining the database query language comprises predicting an intent of the first natural language query that maps to a first cybersecurity domain from a plurality of cybersecurity domains, wherein each of the plurality of cybersecurity domains corresponds to one of the plurality of database query languages and the first cybersecurity domain corresponds to the database query language;

retrieving metadata of one or more first cybersecurity assets indicated in the first natural language query;

generating a first prompt for a first language model corresponding to the database query language, wherein the first prompt at least indicates a grammar for the database query language, the retrieved metadata, and instructions to convert the first natural language query to a database query satisfying the grammar;

prompting the first language model with the first prompt to obtain a first database query as output; and based on determining that the first database query is a valid query for the database query language, retrieving data that satisfies the first database query.

2. The method of claim 1 further comprising, based on determining that the first natural language query is not a valid query for the database query language, generating a second prompt, wherein the second prompt indicates instructions to generate a database query similar to valid database queries for the database query language; and prompting the first language model with the second prompt to obtain a second database query as output.

3. The method of claim 2, wherein generating the second prompt and prompting the first language model with the second prompt comprises:

identifying one or more second natural language queries that are semantically similar to the first natural language query and one or more second database queries corresponding to the one or more second natural language queries, wherein the one or more second database queries are valid queries for the database query language;

generating the second prompt for the first language model to indicate the one or more second natural language queries in association with corresponding ones of the one or more second database queries, wherein generating a database query similar to valid database queries for the database query language comprise generating a database query similar to the one or more second database queries; and prompting the first language model with the second prompt to obtain the second database query as output.

4. The method of claim 2, further comprising:

determining that the second database query is a valid query for the database query language; and retrieving data that satisfies the second database query.

5. The method of claim 1, further comprising determining whether the first database query is a valid query for the database query language, wherein determining whether the first database query is a valid query for the database query language comprises applying a lint program to the first database query.

6. The method of claim 1, wherein the retrieved data indicate one or more second cybersecurity assets related to one or more vulnerabilities indicated in the first natural language query and a graph structure between the one or more second cybersecurity assets and the one or more vulnerabilities.

7. The method of claim 6, wherein the graph structure indicates chains of exposure between assets in the one or more second cybersecurity assets to corresponding ones of the one or more vulnerabilities.

8. The method of claim 6, further comprising generating a summary of the graph structure with a second language model.

9. The method of claim 1, wherein the metadata comprises at least one of vulnerability identifiers corresponding to vulnerabilities indicated in the first natural language query, policy metadata, configuration metadata, and network metadata.

10. The method of claim 1, further comprising, predicting one or more additional cybersecurity domains from the plurality of cybersecurity domains for a second natural language query;

splitting the second natural language query into multiple queries, wherein the multiple queries include at least the first natural language query and wherein each of the multiple queries corresponds to one of the first cybersecurity domain and the one or more additional cybersecurity domains;

determining additional database query languages for the multiple queries corresponding to the one or more additional cybersecurity domains to generate a plurality of database queries; and generating a plurality of prompts including the first prompt, wherein each of the plurality of prompts corresponds to one of the multiple queries and is based on one of the additional database query languages determined for the one of the multiple queries.

11. A non-transitory machine-readable medium having program code stored thereon, the program code comprising instructions to:

identify, from a user utterance, a database query language from a plurality of database query languages, wherein the instructions to identify the database query language comprise instructions to predict an intent of the user utterance that maps to a first cybersecurity domain from a plurality of cybersecurity domains, wherein each of the plurality of cybersecurity domains corresponds to one of the plurality of database query languages and the first cybersecurity domain corresponds to the database query language;

retrieve metadata of one or more first cybersecurity assets indicated in the user utterance;

generate a first prompt for a first language model corresponding to the database query language, wherein the first prompt at least indicates a grammar for the database query language, the retrieved metadata, and instructions to convert the user utterance to a database query satisfying the grammar;

prompt the first language model with the first prompt to obtain a first database query as output; and based on determining that the first database query is a valid query for the database query language, retrieve data that satisfies the first database query.

12. The non-transitory machine-readable medium of claim 11, wherein the program code further comprises instructions to, based on determining that the user utterance is not a valid query for the database query language, generate a second prompt, wherein the second prompt indicates instructions to generate a database query similar to valid database queries for the database query language; and prompt the first language model with the second prompt to obtain a second database query as output.

13. The non-transitory machine-readable medium of claim 12, wherein the program code to generate the second prompt and prompt the first language model with the second prompt comprises instructions to:

identify one or more second natural language queries that are semantically similar to the user utterance and one or more second database queries corresponding to the one or more second natural language queries, wherein the one or more second database queries are valid queries for the database query language;

generate the second prompt for the first language model to indicate the one or more second natural language queries in association with corresponding ones of the one or more second database queries, wherein the instructions to generate a database query similar to valid database queries for the database query language comprise instructions to generate a database query similar to the one or more second database queries; and prompt the first language model with the second prompt to obtain the second database query as output.

14. The non-transitory machine-readable medium of claim 12, wherein the program code further comprises instructions to:

determine that the second database query is a valid query for the database query language; and retrieve data that satisfies the second database query.

15. The non-transitory machine-readable medium of claim 12, wherein the program code further comprises instructions to determine whether the first database query is a valid query for the database query language, wherein the program code to determine whether the first database query is a valid query for the database query language comprises program code to apply a lint program to the first database query.

16. An apparatus comprising:

a processor, and a machine-readable medium having instructions stored thereon that are executable by the processor to cause the apparatus to, identify, from a user utterance, a database query language from a plurality of database query languages, wherein the instructions to identify the database query language comprise instructions that are executable by the processor to cause the apparatus to predict an intent of the user utterance that maps to a first cybersecurity domain from a plurality of cybersecurity domains, wherein each of the plurality of cybersecurity domains corresponds to one of the plurality of database query languages;

retrieve metadata of one or more first cybersecurity assets indicated in the user utterance;

generate a first prompt for a first language model corresponding to the database query language, wherein the first prompt at least indicates a grammar for the database query language, the retrieved metadata, and instructions to convert the user utterance to a database query satisfying the grammar, wherein the grammar at least comprises a syntax of the database query language;

prompt the first language model with the first prompt to obtain a first database query as output; and based on determining that the first database query is a valid query for the database query language, retrieve data that satisfies the first database query.

17. The apparatus of claim 16, wherein the machine-readable medium further has stored thereon instructions executable by the processor to cause the apparatus to, based on determining that the user utterance is not a valid query for the database query language, generate a second prompt, wherein the second prompt indicates instructions to generate a database query similar to valid database queries for the database query language; and prompt the first language model with the second prompt to obtain a second database query as output.

18. The apparatus of claim 17, wherein the instructions to generate the second prompt and prompt the first language model with the second prompt comprise instructions executable by the processor to cause the apparatus to:

identify one or more second natural language queries that are semantically similar to the user utterance and one or more second database queries corresponding to the one or more second natural language queries, wherein the one or more second database queries are valid queries for the database query language;

generate the second prompt for the first language model to indicate the one or more second natural language queries in association with corresponding ones of the one or more second database queries, wherein the instructions to generate a database query similar to valid database queries for the database query language comprise instructions to generate a database query similar to the one or more second database queries; and prompt the first language model with the second prompt to obtain the second database query as output.

19. The apparatus of claim 17, wherein the machine-readable medium further has stored thereon instructions executable by the processor to cause the apparatus to:

determine that the second database query is a valid query for the database query language; and retrieve data that satisfies the second database query.

20. The apparatus of claim 16, wherein the machine-readable medium further has stored thereon instructions executable by the processor to cause the apparatus to determine whether the first database query is a valid query for the database query language, wherein the instructions to determine whether the first database query is a valid query for the database query language further comprise instructions executable by the processor to cause the apparatus to apply a lint program to the first database query.

* * * * *